2,940,997

GEM-DINITRO AMINO ACIDS

Karl Klager, Monrovia, Calif., assignor to Aerojet-General Corporation, Azusa, Calif., a corporation of Ohio No Drawing. Filed July 15, 1957, Ser. No. 672,539

9 Claims. (Cl. 260—534)

This invention relates to new compositions of matter and a method for their preparation. In particular it relates to nitro-containing amino acids having the general formula:

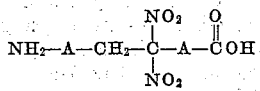

wherein A is an alkylene radical.

This application is a continuation-in-part of my co-pending application Serial No. 426,902, filed April 30, 1954, now abandoned.

The compounds of this invention are prepared by hydrolyzing the aza-polynitro esters with a strong mineral acid, in accordance with the general reaction scheme set forth below:

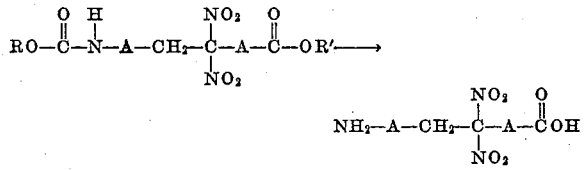

wherein A is an alkylene radical and R and R' are the same or different alkyl radicals.

Any of the strong mineral acids may be used to effect this hydrolysis. For purposes of convenience, however, hydrochloric acid is preferred.

To more clearly illustrate this invention, the following examples are presented. It is to be understood, however, that these examples are presented merely as a means of illustration and are not intended to limit the scope of the invention in any way.

EXAMPLE I

*Preparation of 6-amino-4,4-dinitrohexanoic acid from dimethyl-4,4-dinitro-7-aza-octanedioate*

A mixture of 20 gm. dimethyl-4,4-dinitro-7-aza-octanedioate and 100 ml. concentrated hydrochloric acid was refluxed for 6 hours in a round-bottomed flask. After cooling to room temperature white crystals precipitated, which were collected on a filter and pressed free from mother liquor. The mother liquor was evaporated and the crystalline residue was triturated with cold methanol, filtered, and combined with the first precipitate. The total yield was 14.6 gm. of 6-amino-4,4-dinitrohexanoic acid hydrochloride. Recrystallization from methanol and ether gave colorless crystals, M.P. 180–182° C. with decomposition. The compound is extremely soluble in water, less soluble in alcohol and acetone, and insoluble in ether. The elemental analysis of the product is as follows:

Calculated for $C_6H_{12}N_3O_6Cl$: Percent N, 16.31; percent Cl, 13.76. Found: Percent N, 16.30; percent Cl, 13.87.

Aqueous 10% sodium bicarbonate was added to the solution of 2 gm. 6-amino-4,4-dinitrohexanoic acid hydrochloride in 25 ml. water until carbon dioxide development ceased and the precipitation was complete. The crystals were collected and washed with water. After recrystallization from acetic acid and water the 6-amino-4,4-dinitrohexanoic acid had a M.P. of 190° C. (dec.). The elemental analysis of the product is as follows:

Calculated for $C_6H_{11}N_3O_6$: Percent C, 32.58; percent H, 5.01. Found: Percent C, 33.20; percent H, 5.17.

The methyl 6-carbomethoxy-4,4-dinitrohexanoate was prepared by esterification of methanol. The derivative was in the form of colorless crystals, M.P. 92–93° C., and had the following elemental analysis:

Calculated for $C_8H_{12}N_2O_8$: Percent C, 36.38; percent H, 4.58; percent N, 10.61. Found: Percent C, 37.02; percent H, 4.53; percent N, 10.62.

EXAMPLE II

*Preparation of 6-amino-4,4-dinitrohexanoic acid from propyl 8-carbomethoxy-5,5-dinitro-2-aza-heptanoate*

A mixture of 20 gm propyl 8-carbomethoxy-5,5-dinitro-2-aza-heptanoate and 100 ml. concentrated hydrochloric acid was refluxed for 6 hours in a round-bottomed flask. After cooling to room temperature white crystals precipitated, which were collected on a filter and pressed free from mother liquor. The mother liquor was evaporated and the crystalline residue was triturated with cold methanol, filtered and combined with the first precipitate. The yield, 6-amino-4,4-dinitrohexanoic acid hydrochloride, was recrystallized from methanol and ether to give colorless crystals, M.P. 180–182° C. with decomposition.

Reaction temperatures are not critical in the practice of my invention. Both higher and lower temperatures than those used in the above examples can be used, if desired, without affecting the course of the reaction, however, I prefer to use reflux temperatures for reasons of convenience.

I have also found that aza-nitro diesters such as diethyl 4,4-dinitro-8-aza-nonanedioate and dimethyl 5,5-dinitro-8-aza-nonanedioate undergo hydrolysis to produce their corresponding amino acids; namely, 7-amino-4,4-dinitroheptanoic acid and 7-amino-5,5-dinitroheptanoic acid.

It is apparent from the above discussion that any member of the nitro-containing amino acid series can be prepared by merely selecting the appropriate carboalkoxy-aza-nitro ester and proceeding in accordance with the teachings of this invention.

The nitro-azadiesters used as starting materials are prepared by reacting a carboalkoxy acid halide with sodium azide and then heating to effect rearrangement in the presence of an alcohol, as disclosed in my copending application Serial No. 426,901, filed April 30, 1954, now abandoned.

The amino acids of this invention are useful as ballistic modifiers for conventional blasting explosives such as RDX and PETN. The amino acids can be mixed with the explosive in amounts on the order of from about 1–15% by weight and serve to improve impact stability and reduce the sensitivity of such explosives. The amino acids of my invention also react with β-geminal poly-nitro alcohols such as dinitroethanol to form polynitro-aza-acids which are excellent high explosives.

The high explosives thus prepared can be used in any conventional explosive missile, projectile, rocket, or the like, as the main explosive charge. An example of such a missile is disclosed in U.S. Patent No. 2,470,162, issued May 17, 1949. One way of using the high explosives in a device such as that disclosed in U.S. Patent No. 2,470,162 is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propallant charge, and can be caused to explode on operation of an impact- or time-fuse mechanism firing a detonating explosive such as lead azide or mercury fulminate.

I claim:

1. As new compositions of matter, the nitro-substituted amino acids having the general formula:

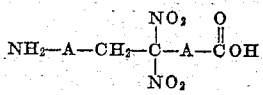

wherein A is a lower alkylene radical.

2. As a new composition of matter, 6-amino-4,4-dinitrohexanoic acid having the structural formula:

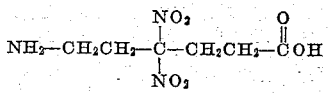

3. As a new composition of matter, 7-amino-4,4-dinitroheptanoic acid having the structural formula:

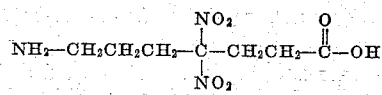

4. As a new composition of matter, 7-amino-5,5-dinitroheptanoic acid having the structural formula:

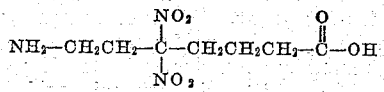

5. The method of preparing nirto-containing amino acids having the general formula:

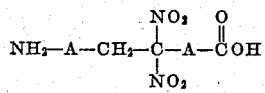

which comprises hydrolyzing carboalkoxy-aza-nitro esters having the general formula:

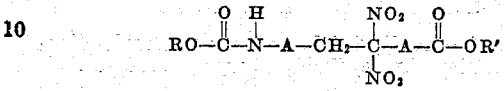

wherein A is a lower alkylene radical and R and R' are lower alkyl radicals, with a strong mineral acid.

6. The method of preparing 6-amino-4,4-dinitrohexanoic acid which comprises hydrolyzing dimethyl 4,4-dinitro-7-azaoctanedioate with a strong mineral acid.

7. The method of preparing 6-amino-4,4-dinitrohexanoic acid which comprises hydrolyzing propyl 8-carbomethoxy-5,5-dinitro-2-aza-heptanoate with a strong mineral acid.

8. The method of preparing 7-amino-4,4-dinitroheptanoic acid which comprises hydrolysing diethyl 4,4-dinitro-8-aza-nonanedioate with a strong mineral acid.

9. The method of preparing 7-amino-5,5-dinitroheptanoic acid which comprises hydrolysing 5,5-dinitro-8-aza-nonanedioate with a strong mineral acid.

No references cited.